United States Patent
Iwamura

[19]

[11] Patent Number: 6,021,830
[45] Date of Patent: Feb. 8, 2000

[54] PNEUMATIC TIRE INCLUDING FINE GROOVE

[75] Inventor: Wako Iwamura, Kobe, Japan

[73] Assignee: Sumitomo Rubber Industries, Ltd., Kobe, Japan

[21] Appl. No.: 09/019,986

[22] Filed: Feb. 6, 1998

[51] Int. Cl.[7] .............................. B60C 11/11; B60C 11/12; B60C 107/00; B60C 115/00

[52] U.S. Cl. ................................ 152/209.15; 152/209.18; 152/209.28; 425/812

[58] Field of Search .......................... 152/209.15, 209.18, 152/209.28, 902; 425/812

[56] References Cited

U.S. PATENT DOCUMENTS

| | | |
|---|---|---|
| 1,380,085 | 5/1921 | Walton . |
| 1,880,430 | 10/1932 | Furnas . |
| 2,130,594 | 9/1938 | Mooradian . |
| 4,690,189 | 9/1987 | Bradisse et al. . |
| 4,947,911 | 8/1990 | Ushikubo et al. . |
| 5,109,903 | 5/1992 | Watanabe et al. . |
| 5,800,642 | 9/1998 | Ohya . |

FOREIGN PATENT DOCUMENTS

| | | |
|---|---|---|
| 604383 | 6/1994 | European Pat. Off. . |
| 54-69191 | 6/1979 | Japan . |
| 3-295705 | 12/1991 | Japan . |
| 4-197806 | 7/1992 | Japan . |
| 7-149114 | 6/1995 | Japan . |
| 1-186633 | 7/1995 | Japan . |
| 1549347 | 8/1979 | United Kingdom . |

*Primary Examiner*—Steven D. Maki
*Attorney, Agent, or Firm*—Birch, Stewart, Kolasch & Birch, LLP

[57] ABSTRACT

A pneumatic tire comprises a tread portion, the tread portion comprising blocks provided with fine grooves for preventing bareness of rubber, the fine grooves having a depth of 0.2 to 0.7 mm and a width of 0.3 to 1.0 mm. The fine groove extends from the angularly narrowest corner of the block to a block edge extending substantially in the circumferential direction. The angularly narrowest corner is provided with a slope having an angle of 30 to 60 degrees to the normal direction to the tread surface.

11 Claims, 4 Drawing Sheets

PNEUMATIC TIRE INCLUDING FINE GROOVE

BACKGROUND OF THE INVENTION

The present invention relates to a pneumatic tire having a tread portion with fine grooves for preventing bareness of rubber.

In the tires vulcanized in a mold, in particular those which have a block type tread pattern, the so-called bare, that is, bareness of the tread rubber tends to occur when the air between the tire and mold is not fully discharged. Therefore, to prevent the occurrence of bareness of the rubber, a mold with a large number of vent holes, and a vacuum mold or a segmental mold are usually used. If a large number of vent holes are utilized, a large number of spurs are inevitably formed in the tread portion of the tire. Thus the appearance is thus bad. It is necessary to cut out the spurs from the tread. However, to cut out the spurs without injuring the tread surface is a difficult or time-consuming undertaking. If the vacuum molds or segmental molds are used, the tire production cost becomes high due to high mold costs.

SUMMARY OF THE INVENTION

It is therefore, an object of the present invention to provide a pneumatic tire in which the occurrence of bareness of rubber is effectively and economically prevented without causing a deterioration in the tire appearance and tire performance, such as road grip and the like.

According to one aspect of the present invention, a pneumatic tire comprises a tread portion, the tread portion comprising blocks provided with fine grooves having a depth D of 0.2 to 0.7 mm and a width W of 0.3 to 1.0 mm.

It is preferable that the blocks are each provided with a fine groove extending generally in the direction in which the block is longest which usually occurs between the opposite corners, thereby making it possible to effectively collect and vent the remaining air. The air between the tire and the mold tends to collect on the angularly narrow corners of the tread blocks whose angle is less than 90 degrees, especially less than 60 degrees. Therefore, the fine groove preferably extends from such a corner to a wide groove existing on the opposite side so that the fine groove extends across substantially the whole block width in the direction of the longest block size. As a result, the number of vent holes of the mold can be decreased.

BRIEF DESCRIPTION OF THE DRAWINGS

The present invention will now be described in greater detail in conjunction with the accompanying drawings, wherein.

DETAILED DESCRIPTION OF THE INVENTION

Figure 1:
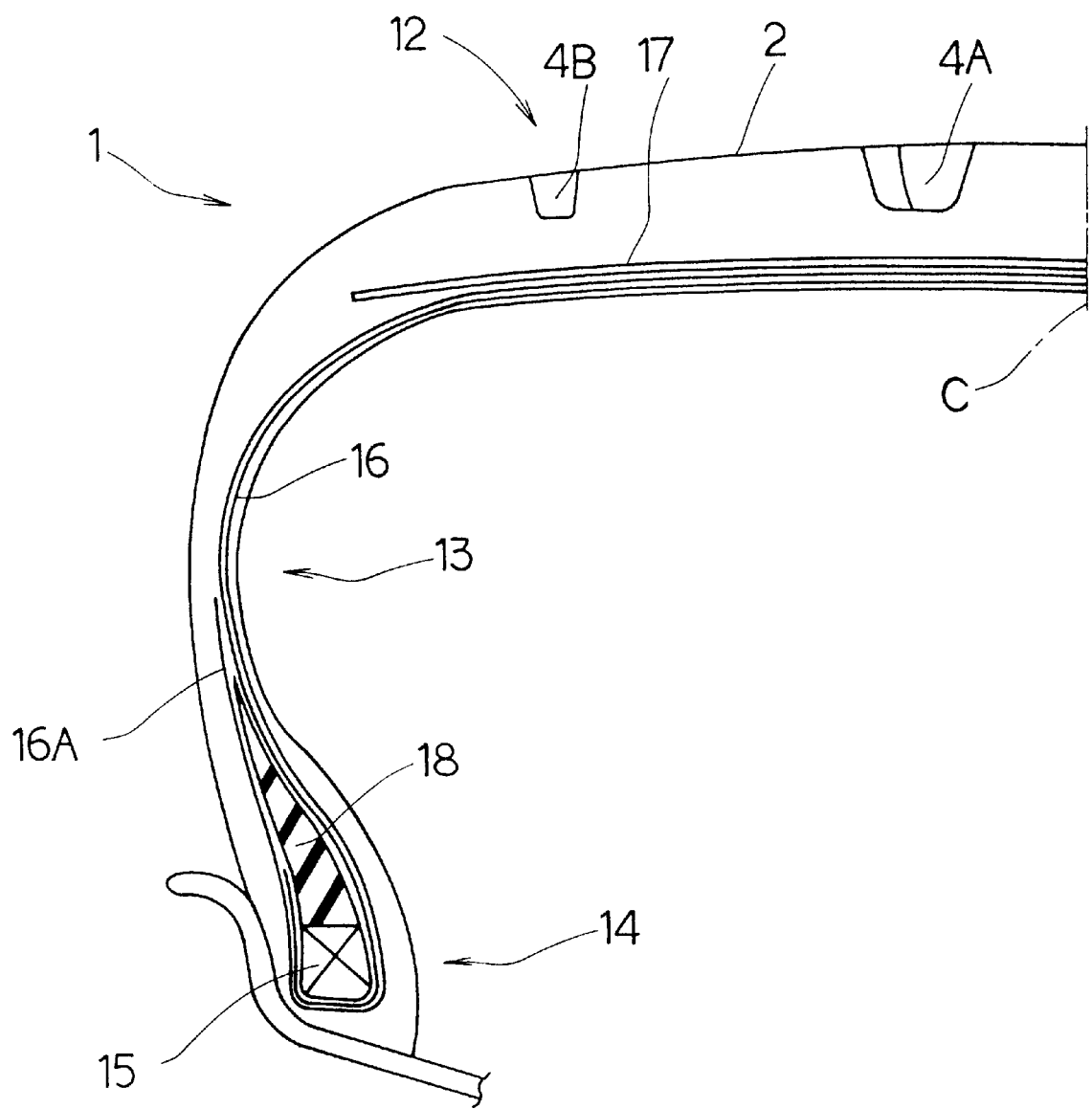
FIG. 1 is a cross-sectional view of an embodiment of the present invention.

In the drawings, pneumatic tire 1 according to the present invention comprises a tread portion 12, a pair of sidewall portions 13, a pair of bead portions 14 with a bead core 15 therein, a toroidal carcass 16 extending between the bead portions 14, and a belt 17 disposed radially outside the carcass 16 and inside the tread portion 12.

The carcass 16 is composed of at least one ply, in this example two plies of cords arranged radially at an angle of 75 to 90 degrees with respect to the tire equator C and extending between the bead portions 14 and turned up around the bead cores 15 from the inside to outside of the tire to form turnup portions 16A and a main portion therebetween. In this example, the turnup portions 16A of the inner carcass ply extend up to the vicinity of the maximum width point of the tire. Thus the inner carcass ply has the so called high turned-up structure. For the carcass cords, organic fiber cords, e.g. nylon, polyester, rayon and the like are used. Between the carcass turnup portion and main portion in each bead portion 14, a rubber bead apex 18 extending radially outwardly from the bead core 15 is disposed.

The belt 17 in this example is composed of a single ply of at least one cord wound spirally at a small angle of 0 to 5 degrees to the tire equator C. For the belt cords, low modulus cords such as nylon and the like are used.

Figure 2:
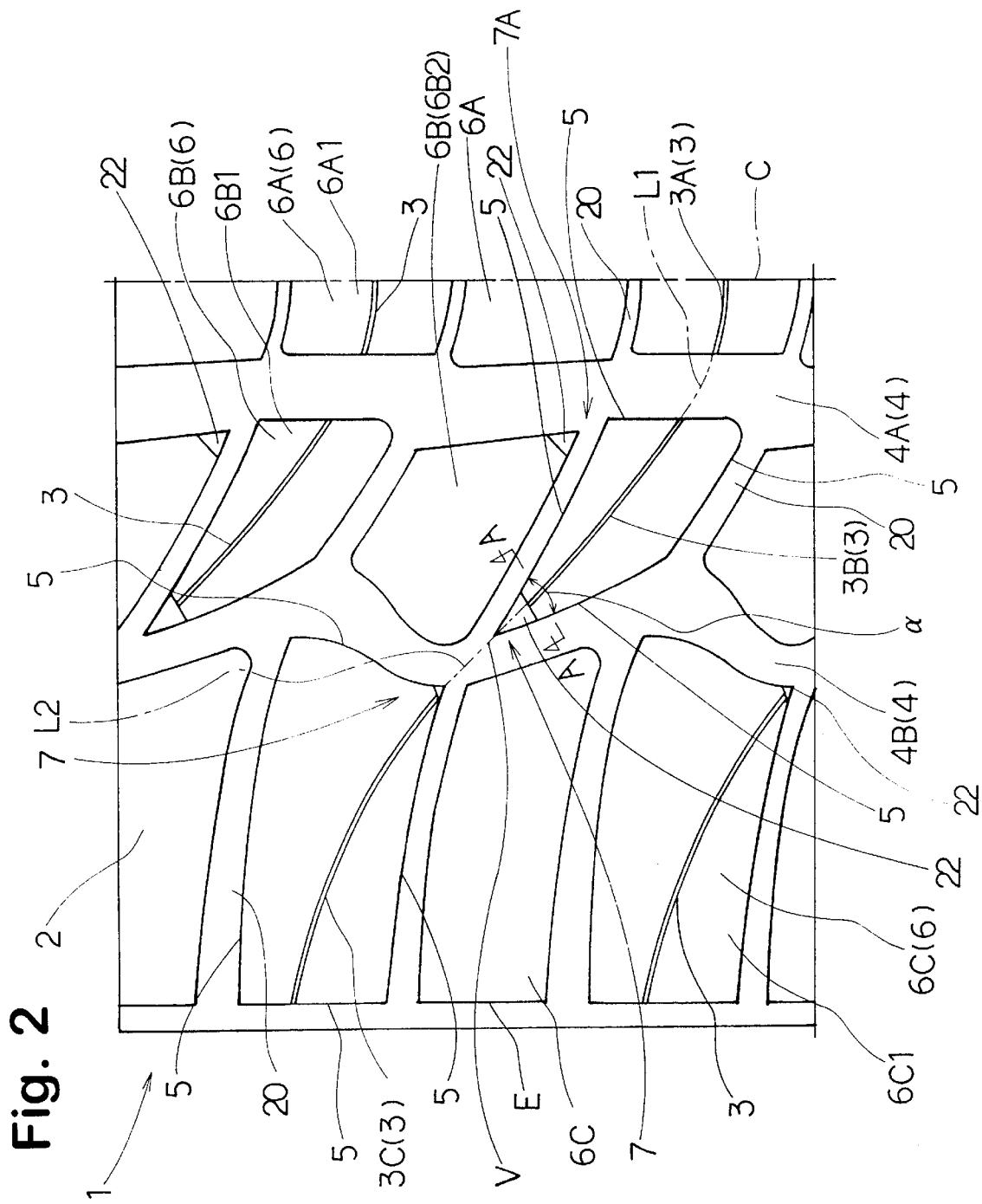
FIG. 2 is a plan view thereof showing an example of the tread pattern.

FIG. 2 shows a left half of the tread portion 12, and in this example, a right half is symmetrical about the tire equator C.

The tread portion 12 is provided with longitudinal grooves 4 extending continuously in the circumferential direction.

The longitudinal grooves 4 in this example comprise a pair of axially inner longitudinal grooves 4A disposed one on each side of the tire equator C, and a pair of axially outer longitudinal grooves 4B disposed axially outside of the longitudinal grooves 4A. The inner longitudinal grooves 4A are substantially straight, but the outer longitudinal grooves 4B are zigzag. The longitudinal grooves 4 have a width of 5 to 20 mm at the tread surface, and a depth of 6 to 15 mm.

The tread portion 12 is further provided with axial grooves 20 extending between the tread edges E. All the axial grooves 20 in this example extend continuously from one of the tread edges E to the other, describing a gentle curved line having a V-shape. The axial grooves 4 have a width of 2 to 8 mm at the tread surface.

By the longitudinal grooves 4 and axial grooves 20, the tread portion 12 is divided into circumferential rows of blocks 6. In this embodiment, therefore, the blocks 6 comprise blocks 6A between the longitudinal grooves 4A, blocks 6B between the longitudinal grooves 4A and 4B, and blocks 6C between the longitudinal grooves 4B and the tread edges E.

The blocks 6 are provided with fine grooves 3. In FIG. 2, every other one (6A1, 6B1, 6C1) of the blocks (6A, 6B, 6C) in each row is provided with a fine groove 3 (3A, 3B, 3C).

The fine groove 3A provided on each of the blocks 6A1 extends from one of the longitudinal grooves 4A to the other in an arched configuration and opens thereto.

The fine groove 3B provided on each of the blocks 6B1 extends from the angularly narrowest corner 7 of the block to a block edge 5 other than the two block edges 5 between which the narrowest corner 7 is formed. The fine groove 3B in this example extends to the longitudinal groove 4A from the corner between the longitudinal groove 4B and an axial groove 20, and therefore, the fine groove 3B opens to both the longitudinal grooves 4A and 4B.

The fine groove 3C provided on each of the blocks 6C1 extends from the angularly narrowest corner 7 of the block adjacent to the longitudinal groove 4B to the axially outer edge of the block, that is, the tread edge E. Therefore, the fine groove 3C opens to the longitudinal grooves 4B and the tread edge E.

The fine groove 3B is configured to connect with an extended line L1 of the above-mentioned fine grooves 3A, and the fine groove 3C is configured to connect with an extended line L2 of the fine grooves 3B so that a series of the fine grooves 3A, 3B and 3C describe a gentle curved line like a V-shape which extend from one of the tread edges E to the other, similarly to the axial grooves 20.

Preferably, both the ends of the fine groove 3 open at block edges. However, it is possible one or both of the ends terminate in the block. In such a case, the distance of the terminated end from the adjacent block edge is set in the range of from 3 to 8 mm, whereby a crack or tear starting from the terminated end can be prevented.

Figure 4:
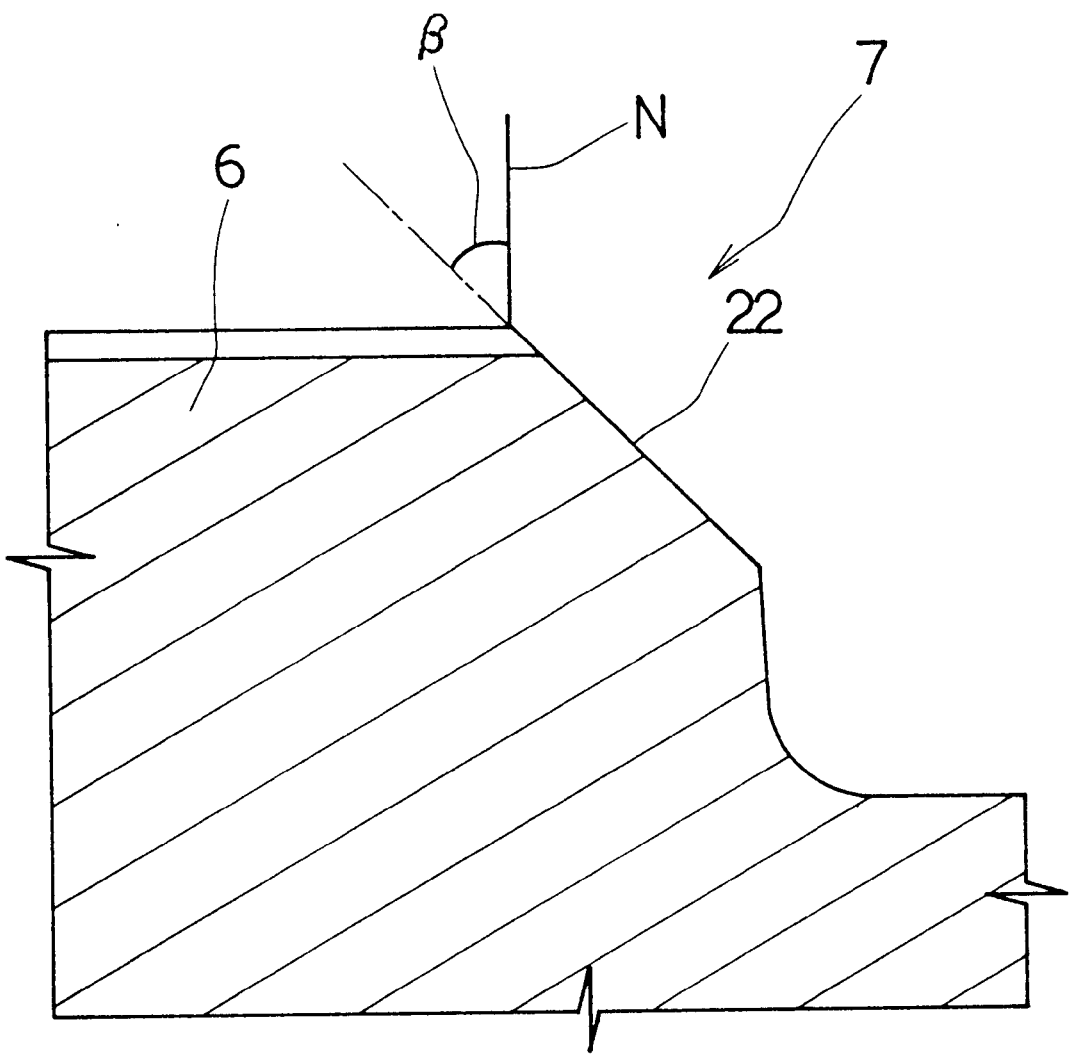
FIG. 4 is a cross sectional view showing a slope formed on the angularly narrowest corner of a tread block.

As shown in FIGS. 2 and 4, the angularly narrowest corners 7 of the blocks 6B and 6C are provided with a slope 22 having an angle β of 30 to 60 degrees to the normal direction N to the tread surface, whereby the occurrence of bareness of rubber in the corner 7 is completely prevented.

In the blocks provided with a fine groove, even if the slope 22 is not provided, the occurrence of bareness of rubber can be prevented by the fine groove. However, the corner is liable to tear due to the existence of the fine groove. Therefore, the slope is preferably formed.

In the blocks not provided with a fine groove, the slope 22 is preferably formed to prevent the occurrence of bareness of rubber in the narrowest corner.

If the angle β is less than 30 degrees or more than 60 degrees, it is difficult to prevent the occurrence of bareness of rubber.

In FIG. 4, the slope 22 is flat, but it can be curved in the vertical plane and/or horizontal plane.

It is also possible to form a fine groove 3 on every block.

Figure 3:
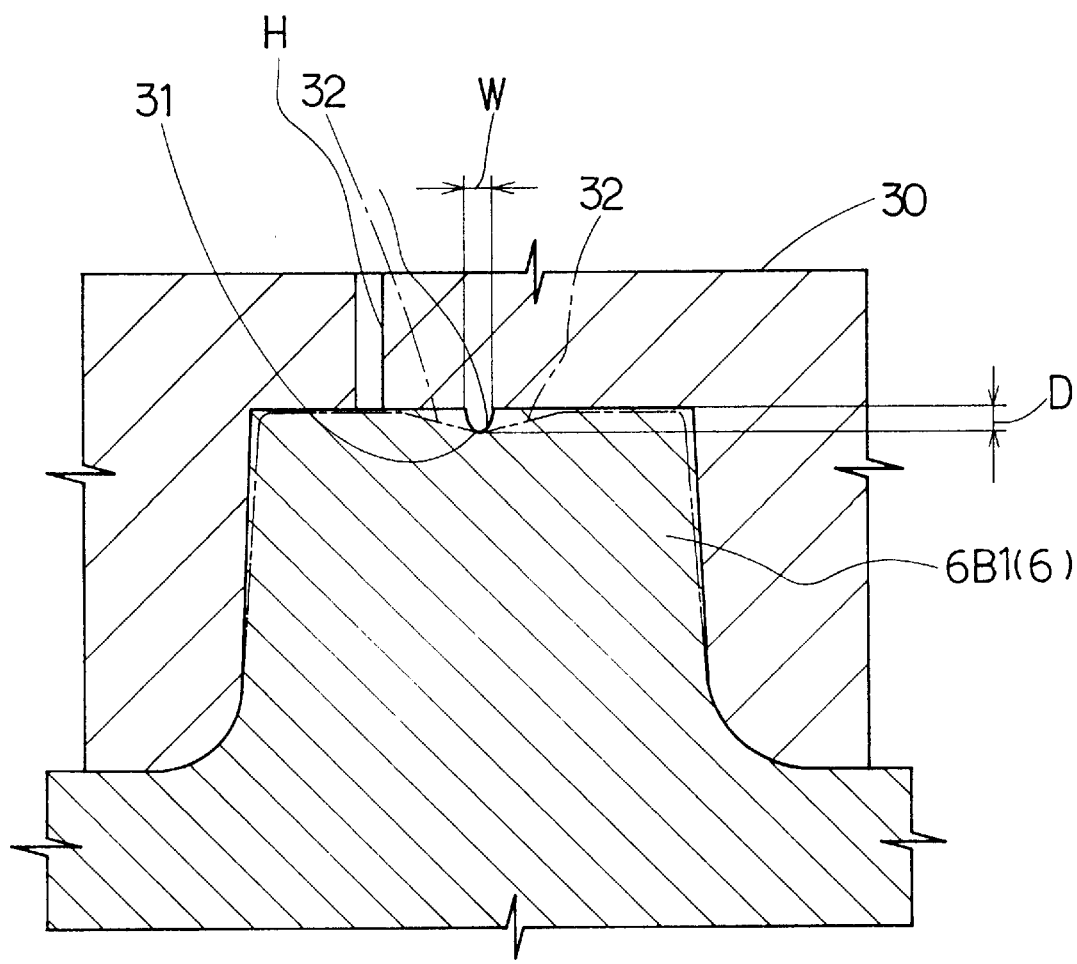
FIG. 3 is a cross sectional view explaining the function of the small ribs for forming fine grooves.

The fine grooves 3 are formed in a process of vulcanizing a raw tire in a mold 30. In the tire mold 30, as shown in FIG. 3, the tread rubber is pressed against small ribs 31 which correspond to the fine grooves 3 and formed in the inner surface of the mold 30. During pressing, although the rubber finally fits to the small rib 31, the rubber is first deformed by the small rib 31 as shown in a chain line, and air passages 32 are formed on both sides of the small rib 31, whereby, the occurrence of bareness of rubber is prevented.

The depth D of the fine grooves 3 or the height the small ribs 31 is set in the range of from 0.2 to 0.7 mm, more preferably not less than 0.3 mm. If the depth D of the fine grooves 3 is less than 0.2 mm, the cross sectional area of the air passages 32 decreases, and the occurrence of bareness can not be prevented. If the depth D is more than 0.7 mm, it affects the pattern rigidity and the design of the tread pattern.

The width W of the fine grooves 3 or the small ribs 31 is 0.3 to 1.0 mm, more preferably not less than 0.6 mm. If the width W of the fine grooves 3 is less than 0.3 mm, the sectional area of the air passages 32 decreases, and it is difficult to fully prevent the occurrence of bareness of rubber. If the width W is more than 1.0 mm, the pattern rigidity is liable to decrease and as a result dry grip performance is liable to decrease.

Comparison Test

Test tires having the same structure shown in FIG. 1 and the same tread pattern shown in FIG. 2 except for fine grooves were made by way of test and tested as follows.

(1) Rubber bareness test

The test tires were examined whether bareness of rubber occurred or not when the tire mold was provided with four vent holes on every block.

(2) Minimum vent hole test

The minimum number of vent holes per one block by which the occurrence of bareness of rubber could be completely prevented was obtained.

(3) Appearance test

The appearance of test tires were evaluated by testers' feeling. In Table 1, the results are indicated by an index based on the prior art tire being 100. The larger the value, the better the appearance.

(4) Dry grip test, Wet grip test and Noise test

A test car (3000cc FR passenger car) provided on all the wheels with test tires was run in a test course, and the maximum critical speed was measured under dry and wet conditions. Further, the running noise was evaluated by the driver's feeling. In Table 1, the results are indicated by an index based on the prior art tire being 100. The larger the value, the better the performance.

| Tire size: | 225/50R16 |
|---|---|
| Wheel Rim: | 16X7JJ standard rim |
| Pressure: | 2.2 kg/sq.cm (normal pressure) |
| Tire load: | 360 kg |
| Carcass: | two plies of 1100 d nylon cords arranged at an angle of 90 degrees to the tire equator and a cord count of 48/5 cm (including one high turned-up ply) |
| Belt: | a single ply of 1400 d nylon cords wound spirally at almost zero degree to the tire equator and a cord count of 49/5 cm |
| Longitudinal groove | |
| Width: | about 12 mm |
| Depth: | about 8 mm |
| Axial groove | |
| Width: | about 4 mm |
| Depth: | about 7 mm |

It was confirmed that the occurrence of bareness of rubber in the tires according to the present invention can be prevented without increasing the number of vent holes and without decreasing tire performance.

TABLE 1

| Tire | Ex. 1 | Ex. 2 | Ex. 3 | Ex. 4 | Ex. 5 | Prior | Ref. 1 | Ref. 2 | Ref. 3 | Ref. 4 | Ref. 5 | Ref. 6 | Ref. 7 |
|---|---|---|---|---|---|---|---|---|---|---|---|---|---|
| Fine groove | | | | | | | | | | | | | |
| Depth D *1 (mm) | 0.4 | 0.4 | 0.4 | 0.2 | 0.6 | — | 0.8 | 2 | 0.4 | 0.4 | 0.1 | 0.8 | −0.4 |
| Width W (mm) | 0.8 | 0.5 | 1 | 0.8 | 0.8 | — | 2 | 0.8 | 0.2 | 1.1 | 0.8 | 0.8 | 0.8 |
| Test results | | | | | | | | | | | | | |
| Bareness *2 | ○ | ○ | ○ | ○ | ○ | X | ○ | X | X | ○ | X | ○ | ○ |

TABLE 1-continued

| Tire | Ex. 1 | Ex. 2 | Ex. 3 | Ex. 4 | Ex. 5 | Prior | Ref. 1 | Ref. 2 | Ref. 3 | Ref. 4 | Ref. 5 | Ref. 6 | Ref. 7 |
|---|---|---|---|---|---|---|---|---|---|---|---|---|---|
| Vent holes | 4 | 4 | 4 | 4 | 4 | 6 | 4 | 6 | 5 | 4 | 5 | 4 | 4 |
| Appearance | 110 | 105 | 102 | 105 | 105 | 100 | 95 | 110 | 95 | 98 | 95 | 100 | 100 |
| Dry grip | 100 | 100 | 100 | 100 | 100 | 100 | 95 | 95 | 100 | 98 | 100 | 95 | 95 |
| Wet grip | 100 | 100 | 100 | 100 | 100 | 100 | 100 | 100 | 100 | 100 | 100 | 100 | 100 |
| Noise | 105 | 102 | 102 | 105 | 105 | 100 | 95 | 95 | 100 | 96 | 100 | 100 | 100 |

*1) X = bareness of rubber occurred,
○ = not occurred.

The present invention can be suitably applied to various kinds of block pattern tires, e.g. passenger car tires, truck/bus tires and the like.

I claim:

1. A pneumatic tire comprising
a rubber tread portion,
the tread portion comprising blocks provided with only one fine groove for preventing bareness of rubber,
the fine groove having a depth of 0.2 to 0.17 mm and a width of 0.3 to 1.0 mm,
the fine groove extending from an acute angle corner of the block to an edge of the block being opposite said acute angle corner, and
the corner being provided with a slope having an angle of 30 to 60 degrees with respect to the normal direction to the tread surface.

2. The pneumatic tire according to claim 1, wherein said acute angle corner is an angularly narrowest corner and said edge extends substantially in the circumferential direction.

3. A pneumatic tire according to claim 1, further comprising:
a pair of sidewall portions;
a pair of bead portions;
a pair of bead cores, wherein each bead core is disposed within one of the bead portions;
a toroidal carcass extending between the bead portions; and a belt disposed radially outside the carcass and inside the tread portion.

4. A pneumatic tire according to claim 1, further comprising:
a pair of axially inner longitudinal grooves, wherein each inner longitudinal groove is substantially straight; and
a pair of axially outer longitudinal grooves, wherein each outer longitudinal groove is zigzag.

5. A pneumatic tire according to claim 1, including axial grooves extending continuously from one tread edge to the other tread edge and defining a gentle curved line having a V-shape.

6. A pneumatic tire comprising a rubber tread portion, wherein the tread portion is divided into circumferential rows of blocks, the blocks in each row are alternately provided with a fine groove extending from one corner of the block to an edge of the block being opposite the corner, the fine grooves having a depth of 0.2 to 0.7 mm and a width of 0.3 to 1.0 mm, whereby bareness of rubber is prevented and alternate blocks are without fine grooves.

7. The pneumatic tire according to claim 6, wherein one of said one corner is an angularly narrowest corner, and the fine groove extends from the angularly narrowest corner to an edge of the block extending substantially in a circumferential direction.

8. The pneumatic tire according to claim 5, wherein the angularly narrowest corner is provided with a slope having an angle of 30 to 60 degrees with respect to the normal direction to the tread surface, and further the blocks without fine grooves are also provided in the angularly narrowest corners with a slope having an angle of 30 to 60 degrees with respect to the normal direction of the tread surface.

9. A pneumatic tire according to claim 6, further comprising:
a pair of sidewall portions;
a pair of bead portions;
a pair of bead cores, wherein each bead core is disposed within one of the bead portions;
a toroidal carcass extending between the bead portions; and a belt disposed radially outside the carcass and inside the tread portion.

10. A pneumatic tire according to claim 6, further comprising:
a pair of axially inner longitudinal grooves, wherein each inner longitudinal groove is substantially straight; and
a pair of axially outer longitudinal grooves, wherein each outer longitudinal groove is zigzag.

11. A pneumatic tire according to claim 6, including axial grooves extending continuously from one tread edge to the other tread edge and defining a gentle curved line having a V-shape.

* * * * *